US009356408B1

(12) United States Patent
Biddle et al.

(10) Patent No.: US 9,356,408 B1
(45) Date of Patent: May 31, 2016

(54) EXTENSIBLE PORTS FOR ELECTRONIC DEVICES

(71) Applicant: Amazon Technologies, Inc., Reno, NV (US)

(72) Inventors: Jonathan Howard Biddle, San Francisco, CA (US); Christopher Green, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 528 days.

(21) Appl. No.: 13/742,185

(22) Filed: Jan. 15, 2013

(51) Int. Cl.
  *H01R 31/06* (2006.01)
  *H01R 24/76* (2011.01)

(52) U.S. Cl.
  CPC ...................................... *H01R 24/76* (2013.01)

(58) Field of Classification Search
  CPC .... H05K 5/0295; G06F 1/1675; H01R 13/72; H01R 13/60; H01R 31/005; H01R 31/06; H01R 25/003; H01R 2201/06
  USPC .................. 439/119, 518, 628, 638, 915, 131
  See application file for complete search history.

(56) References Cited

U.S. PATENT DOCUMENTS

| | | | | |
|---|---|---|---|---|
| 5,162,681 A * | 11/1992 | Lee | .................................. | 327/53 |
| 5,692,914 A * | 12/1997 | Mitani et al. | .................. | 439/131 |
| 6,579,108 B1 * | 6/2003 | Goff | ............................... | 439/131 |
| 8,274,786 B2 * | 9/2012 | Sapper et al. | ................... | 439/131 |
| 8,348,684 B2 * | 1/2013 | Ladouceur et al. | ............ | 439/131 |
| 2001/0019907 A1 * | 9/2001 | Glad et al. | ...................... | 439/131 |
| 2007/0141917 A1 * | 6/2007 | Kolton et al. | ................. | 439/668 |
| 2011/0013372 A1 * | 1/2011 | Kang | ............................. | 361/752 |
| 2011/0201213 A1 * | 8/2011 | Dabov | ................... | H01R 24/58 439/39 |
| 2012/0156907 A1 * | 6/2012 | Ladouceur et al. | ............ | 439/131 |
| 2013/0034979 A1 * | 2/2013 | Chang et al. | .................... | 439/131 |
| 2013/0107465 A1 * | 5/2013 | Huang et al. | ................... | 361/725 |
| 2013/0114843 A1 * | 5/2013 | Li | .......................... | H01R 24/58 381/384 |
| 2013/0162122 A1 * | 6/2013 | Li et al. | ....................... | 312/223.1 |
| 2014/0120751 A1 * | 5/2014 | Senatori | ........................ | 439/131 |

* cited by examiner

*Primary Examiner* — Hoa C Nguyen
*Assistant Examiner* — Christopher L Augustin
(74) *Attorney, Agent, or Firm* — Seyfarth Shaw LLP; Ilan N. Barzilay

(57) ABSTRACT

An electronic device can be configured to support a port that connects to a plug or jack such that the face of the port is substantially equal to or greater in size than at least one dimension of the electronic device. The electronic device can then continue to support connections to peripheral devices and other devices having plugs and jacks of various sizes, and the electronic device is not necessarily limited to a certain depth or thickness. This can be achieved by electronic devices that incorporate adaptive or extensible ports that are retracted in one state and extended in a second state to support the plugs or jacks such that the face of the port substantially meets or exceeds at least one dimension of the electronic device. Alternatively, or in addition, other embodiments can incorporate resilient materials for certain portions of the port.

16 Claims, 8 Drawing Sheets

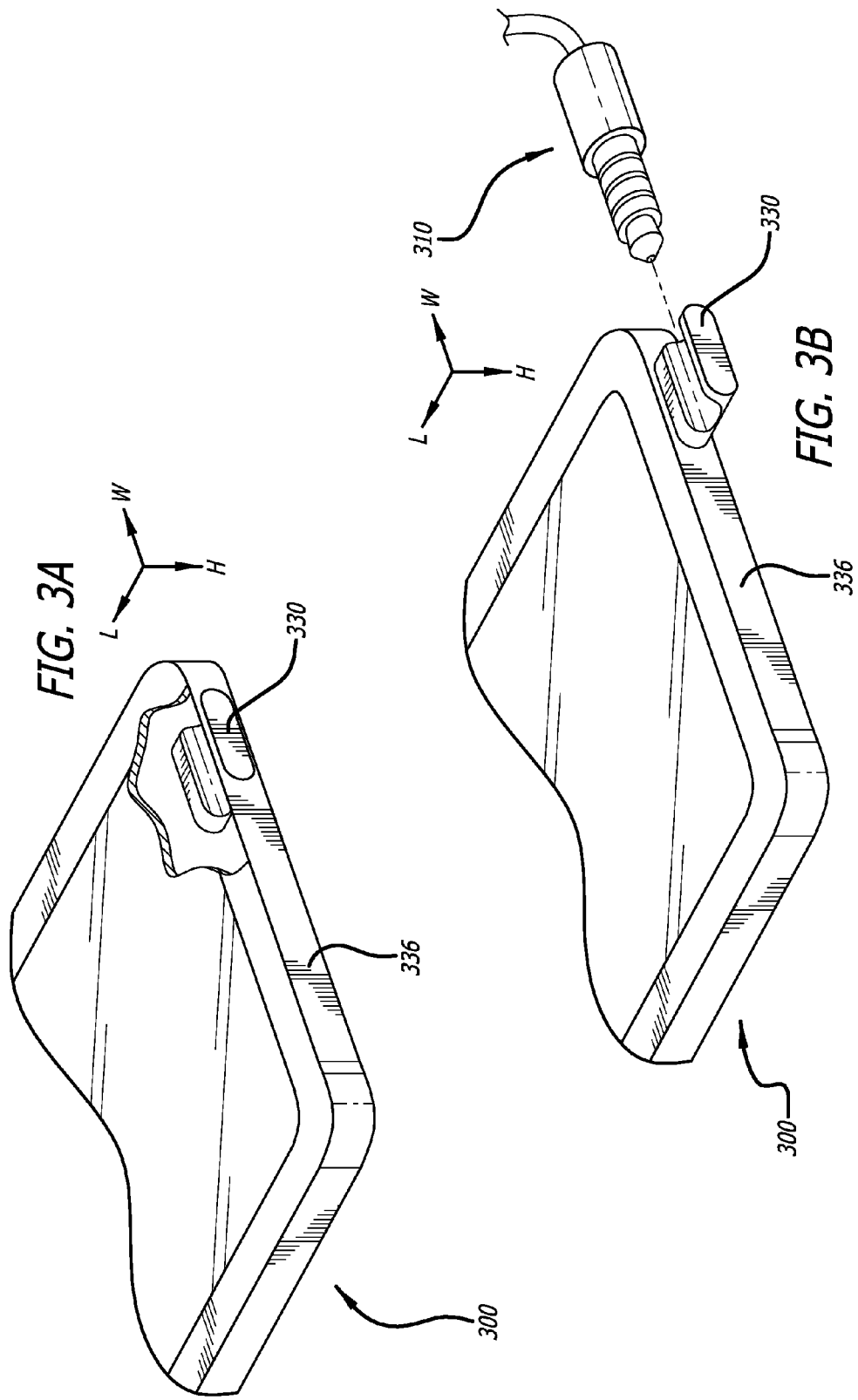

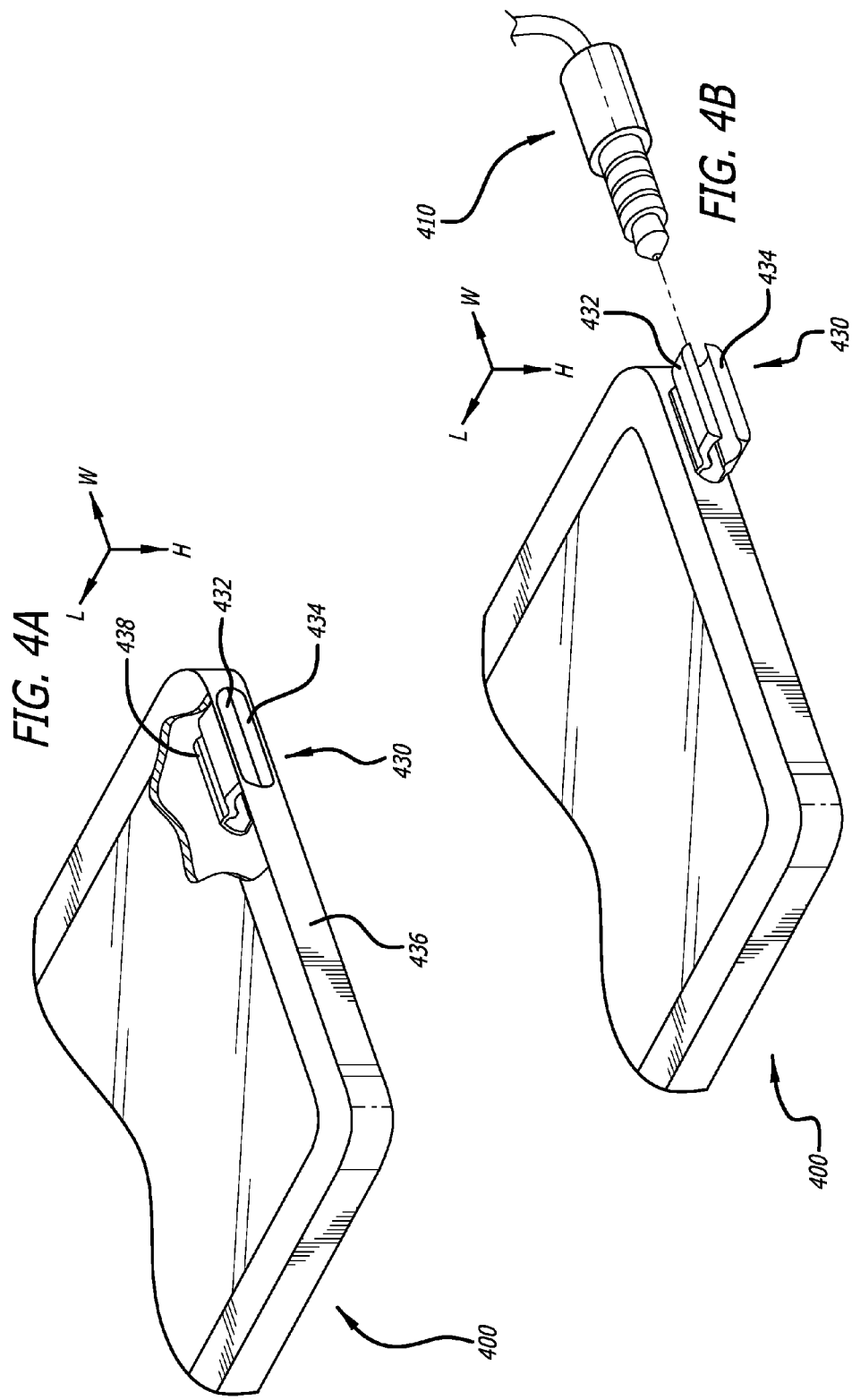

EXTENSIBLE PORTS FOR ELECTRONIC DEVICES

BACKGROUND

Each new generation of electronic devices is typically designed to be smaller and lighter than those of the previous generation. This is sometimes borne out of a desire for cost savings, such as from the reduction in raw materials used to manufacture a device. Next generation devices that are lighter and smaller may also sometimes be more energy efficient than preceding devices. Electronic devices that are thinner, such as computers or televisions, may also be preferable because they can be placed in a greater variety of locations or take up less physical space. Users may also prefer personal electronic devices, such as smartphones, tablets, or laptop computers, to be thinner, more compact, and lighter for the additional comfort, flexibility, and portability that such devices can provide. Newer electronic devices, however, may also need to be designed to support legacy technologies that may not necessarily be compatible with electronic devices having different configurations or form factors.

BRIEF DESCRIPTION OF THE DRAWINGS

Various embodiments in accordance with the present disclosure will be described with reference to the drawings, in which:

FIGS. 3A-3D illustrate an example of an electronic device with an adaptive port in accordance with one embodiment;

FIGS. 4A-4C illustrate an example of an electronic device with an adaptive port in accordance with one embodiment;

DETAILED DESCRIPTION

Figure 1:
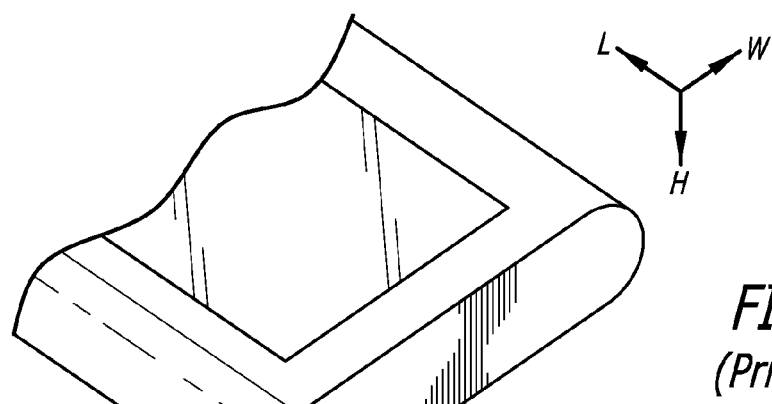
FIG. 1 illustrates an example of an electronic device with a conventional audio output port.

Thin, compact, and light electronic devices may be preferable to users for a variety of reasons, such as lower manufacturing costs, energy efficiency, and/or increased portability and flexibility. Thin electronic devices, however, may also need to be designed to comport with existing standards or technologies. For example, most homes and buildings in North America are electrically wired for AC outlets that conform to the standards of the National Electrical Manufacturers Association (NEMA). Many European countries, meanwhile, use AC outlets compliant with the International Commission on the Rules for the Approval of Electrical Equipment (IECEE/CEE), and China uses AC outlets compliant with the Compulsory Product Certification System (CPCS). Electronic devices that require power, whether during a power-on state or via a rechargeable battery (or batteries), may need to be designed to be capable of supporting jacks or plugs that interface with one of these disparate types of AC outlets. As another example, many conventional headphones, microphones, or other audio devices have plugs or jacks that are intended to plug into a circular port or socket, such as an audio jack or plug that is 2.5 mm (approximately ³⁄₃₂"), 3.5 mm (approximately ¼"), or 6.35 mm (¼") in diameter. As yet another example, electronic devices can also include one or more ports for other data, such as one or more ports to support the Universal Serial Bus (USB™) standard. The inner dimensions of the faces of ports that are compatible with USB™ standards can range from 12.5 mm×5.12 mm (Type A) to 6.80 mm×1.85 mm (Micro family). Thus, the height or thickness of a conventional electronic device may be limited to certain dimensions in order to support ports or sockets that are compatible with certain AC outlets, audio plugs or jacks, USB™ connectors, and other types of connectors.

In other situations, a user may have previously purchased peripheral devices or other devices that incorporate plugs or connectors of certain sizes. The user may not want to abandon her previous investments in these peripheral devices or other devices. Accordingly, the user may not purchase a new electronic device if it does not support or connect with older devices. For example, the peripheral device may be in-ear monitors (IEMs) that have been customized specifically for the user. Such IEMs can be substantially costlier than a paired audio output device such that it would not make economic sense for the user to purchase an audio output device that doesn't support her IEMs. In addition, conventional solutions such as using adaptor plugs or splicing the wiring on existing peripheral devices to incorporate a compatible plug or connector may be undesirable because of poor performance or may be less elegant to the user. In other cases, the user may have a strong affinity for a particular peripheral device or other device that does not include a plug or connector that is compatible with a port on a thin electronic device. Lack of support by the new electronic device for the older plug or connector may preclude the user from purchasing the new electronic device. Systems and methods in accordance with various embodiments of the present disclosure may overcome one or more of the aforementioned and other deficiencies of conventional electronic devices.

In various embodiments, an electronic device may include at least one port that can be adapted or is extensible to support a plug or jack such that at least one of the outer dimensions of the port is substantially equal to or greater than at least one dimension of the device when the port slides or spreads out or is extended, expanded, enlarged, lengthened, widened, broadened, etc. In certain embodiments, the adaptive or extensible port may be retractable such that the port is recessed within a cavity or compartment of the housing of the electronic device when there is no external physical connection to the port. The adaptive or extensible port can be extended to physically connect the device to a plug or a jack (e.g., such as a power plug, headphone or audio jack, USB™ connector, or other type of connection). In addition, the adaptive or extensible port may be configured for a plug or jack of one size when recessed and be configured for a plug or jack of a second, larger size when extended. For instance, the adaptive or extensible port may be configured for connecting to headphones with a 2.5 mm plug when the port is recessed. The adaptive or extensible port can be extended to support headphones with a 3.5 mm plug, wherein the outer diameter of the port may be substantially equal to or greater than the thickness of the electronic device. As another example, the adaptive or extensible port may support a connector compliant with the latest version of standard when the port is in one state, e.g., the recessed state, and the port can support a connector compliant with an older version of the standard when the port is in a second state, e.g., an extended state, such that the device is backwards compatible with respect to the standard.

In one embodiment, a plurality of clasps or a clutching mechanism can be extended from the housing of the device to enable the user to plug a connector, such as an audio jack for headphones or other audio device, into the clasps or the clutching mechanism. In another embodiment, a tray-like structure may slide out from within the housing of the device to support a plug or jack such that the port is substantially equal to or greater than the device along at least one dimension. The tray may be configured to substantially encircle the plug or jack, and connect electrical contacts of the device to the corresponding contacts of the plug or jack. In yet another embodiment, a clip-like structure can spring from the electronic device to accommodate a plug or jack having at least one dimension that is substantially equal to or greater than the device's thickness. In some of these embodiments, the port can be configured to support plugs or jacks of various shapes and sizes. For example, each of the clasps, the clutching mechanism, the tray, or the clip structure may be configurable to support connectors of disparate sizes.

In other embodiments, a port of an electronic device can be configured to be adaptive or extensible by incorporating a resilient material such as a plastic (e.g., Acrylonitrile-butadiene-styrene, fluorocarbons, polyamides, polycarbonates, polyethylenes, polypropylenes, polystyrenes, vinyls, etc.), an elastomer (e.g., polyisoprene, Sytrene-butadiene copolymer, Acyrlonitrile-butadiene copolymer, chloreprene, polysiloxane, etc.), a thermoplastic elastomer (e.g., styrenic block copolymers, polyolefin blends, elastomeric alloys, thermoplastic polyurethanes, thermoplastic copolyster, thermoplastic polyamides, etc.), or similar resilient and pliant materials. In one embodiment, a portion of the port can be composed of the resilient material. When the port is not externally connected to a plug or jack, the port is at least partially closed and the device is substantially flat. When the user plugs into the adaptive or extensible port, the resilient material of the port deforms to allow for connection of the plug or jack to the device and the resilient material protrudes at where the plug or jack is in place. In another embodiment, the device can include substantially flat contacts that correspond to the contacts of an external plug or jack. When the device is not externally connected to the plug or jack, the contacts of the device may be covered and protected by a cover comprising a resilient material. When the user desires to connect the device to an external plug or jack, the user may uncover the resilient material to connect the device, and the resilient cover can be returned to its original position to envelop the plug or jack. The resilient cover or material can be magnetized to further secure the plug or jack. In another embodiment, where the resilient material runs the length and/or width of the device, the resilient material may be "rolled" to attach (or detach) the plug or jack and "unrolled" to cover and protect the plug or jack (or to cover and protect the contacts).

Various other systems, features, and uses are presented below with respect to the various embodiments.

FIG. 1 illustrates an electronic device 100 with a conventional socket or port 130 for connecting to a plug or connector 110 of a peripheral device such as headphones, a microphone, or other audio device. In this example, the port 130 is circular, and the inner diameter measures 3.5 mm (approximately ⅛"), the outer diameter measures approximately 5.5 mm, and the device 100 is approximately 11.0 mm thick. Other electronic devices may use audio ports with an inner diameter of 6.35 mm (¼") or 2.5 mm (approximately 3/32")—(each with an outer diameter measuring approximately 1.5 mm to 2.0 mm more than the inner diameter in some instances). Some electronic devices may include more than one audio port, such as one port to support headphones and a second port to support a standalone microphone. In this instance, the electronic device 100 is limited to a certain thickness in order to incorporate the conventional port 130.

Alternatively, or in addition, electronic devices can include other ports having various shapes and sizes. For example, electronic devices can include one or more data ports that are compliant with one or more Universal Serial Bus (USB™) standards. The USB™ connector mounted on the device may be referred to as the receptacle (also known as the female), and the connector on a USB™ cable may be referred to as the plug (also known as the male). USB™ receptacles can be classified as Type A, Type B, Mini-B, Mini-B, Mini-AB, Micro-AB, and Micro-B. The face of Type A receptacles (or plugs) can be generally rectangular in shape, and the face of the USB™ Type A receptacle (or plug) can measure approximately 12.5 mm×5.12 mm. In some electronic devices, the housing structure for the Type A receptacle can measure approximately 16.00 mm×10.70 mm×14.3 mm, although these dimensions are subject to variation. For example, the height of the housing for the USB™ can vary depending on whether the socket is surface mounted or pin mounted.

The face of the Type B receptacle (or plug) can be generally square in shape with two beveled corners, and the face of the Type B receptacle (or plug) can measure approximately 8.45 mm×7.78 mm. In some electronic devices, the housing for the Type B receptacle can measure approximately 12.00 mm×11.50 mm×16.00 mm. The Mini family of USB™ receptacles (or plugs) (e.g., Mini-A, Mini-B, and Mini-AB) can be generally trapezoidal in shape with one segment that may be longer than a parallel segment. The face of the receptacles (or plugs) for the USB™ Mini family can measure approximately 6.80 mm×3.00 mm, and a surface mounted socket for the Mini family of receptacles can measure approximately 9.90 mm×4.0 mm×9.30 mm. The face of the Micro family of USB™ receptacles (or plugs) (e.g., Micro-AB, Micro B) is also generally trapezoidal in shape with one segment that may be longer than a parallel segment. The face of the Micro family of receptacles (or plugs) can measure approximately 6.80 mm×1.85 mm, and a surface mounted socket for the Micro family of USB™ receptacles can measure approximately 8.00 mm×2.95 mm×5.63 mm.

Alternatively, or in addition, electronic devices can include other ports for distributing to/from the device power, video data, audio data, other data, or combinations thereof. For example, video ports can include those compliant with the High Definition Multimedia Interface (HDMI®), Digital Visual Interface (DVI™), and/or DisplayPort™ HDMI® ports can be classified as Type A, Type B, Type C, Type D, or Type E. HDMI® receptacles are generally trapezoidal in shape. The faces of Type A receptacles (or plugs) can measure approximately 14.00 mm×4.55 mm, the faces of Type B receptacles (or plugs) can measure approximately 21.20 mm×4.45 mm, the face of Type C (also known as Mini HDMI®) receptacles (or plugs) can measure approximately 10.50 mm×2.50 mm, the face of Type D (also known as Micro HDMI®) receptacles (or plugs) can measure approximately 6.40 mm×2.80 mm, and Type E receptacles are used for automotive connection systems and feature a locking tab to keep cables from vibrating loose, and a shell to prevent moisture and dirt. The faces of DVI™ receptacles (or plugs) are generally trapezoidal in shape with rounded corners, and the face of a DVI™ receptacle (or plug) can measure approximately 24.00 mm×7.74 mm DisplayPort™ receptacles (and plugs) can come in two flavors. The face of a DisplayPort™ receptacle (or plug) is generally rectangular in shape with one beveled corner, and the face of the receptacle (or plug) can measure approximately 16.50 mm×4.76 mm. The face of a Mini DisplayPort™ receptacle (or plug) is generally rectangular in shape with two beveled corners, and the face of the Mini DisplayPort™ receptacle (or plug) can measure approximately 8.30 mm×5.40 mm.

Electronic devices may also include a variety of different data ports, such as fiber optic connectors like Straight Tip (ST) connectors from AT&T®, Subscriber Connector or Standard Connector (SC) connectors from NTT (Japan), Fiber Distributed Data Interface (FDDI) connectors, MTP® connectors from US Conec, or Lucent Connector (LC) connectors from Lucent Technologies; modular network connectors such as Registered Jack (RJ)-11, RJ-12, RJ-22, RJ-45 (commonly used for Ethernet-based networks), RJ-48, or the Modified Modular Plug (MMP) from Digital Equipment Corporation (DEC); slots for Secure Digital (SD™) non-volatile memory cards; and other proprietary data ports.

Returning to FIG. 1, the audio plug 110 is an example of a TRRS connector having an elongated cylindrical shape split up by insulating rings to form four separate contacts (tip, ring, ring, and sleeve). The contact of the connector 110 most proximate to the device 100 may be referred to as the tip 102. This is separated by a first insulating ring 120 from a second contact in the shape of a conductive ring 104, which is in turn separated by a second insulating ring 122 from a third contact, also in the shape of a ring 106. The ring 106 is separated by a third insulating ring 124 from a fourth contact most distal from the device 100, and may be referred to as the sleeve 108. Other variations of the TRRS connector may include fewer contacts, such as a TS (tip, sleeve) connector or a TRS (tip, ring, sleeve) connector. Still other types of audio ports that can be supported by an electronic device can include a 3.5 mm Optical Mini Plug, a banana plug, an RCA plug, TOSLINK® from Toshiba, or XLR plug from ITT Cannon.

In this example, the conventional audio port 130 has internal contacts that correspond to the tip, ring, ring, and sleeve of the TRRS connector 110. One typical configuration for the internal contacts of the port 130 is for the internal contact corresponding with the tip 102 to be associated with left stereo sound, the ring 104 to be associated with right stereo sound, the ring 106 to be associated with ground, and the sleeve 108 to be associated with a microphone signal or input control signal(s) such as for a remote control. In other configurations, the internal contacts of the second ring 106 and the sleeve 108 can instead be associated with the microphone or other input signal(s) and ground, respectively. Still other configurations can be used, and at least some embodiments can accommodate the various configurations, such as by dynamically programming the internal contacts of the device to correspond to the contacts of the external plug or connector.

Figure 2A:
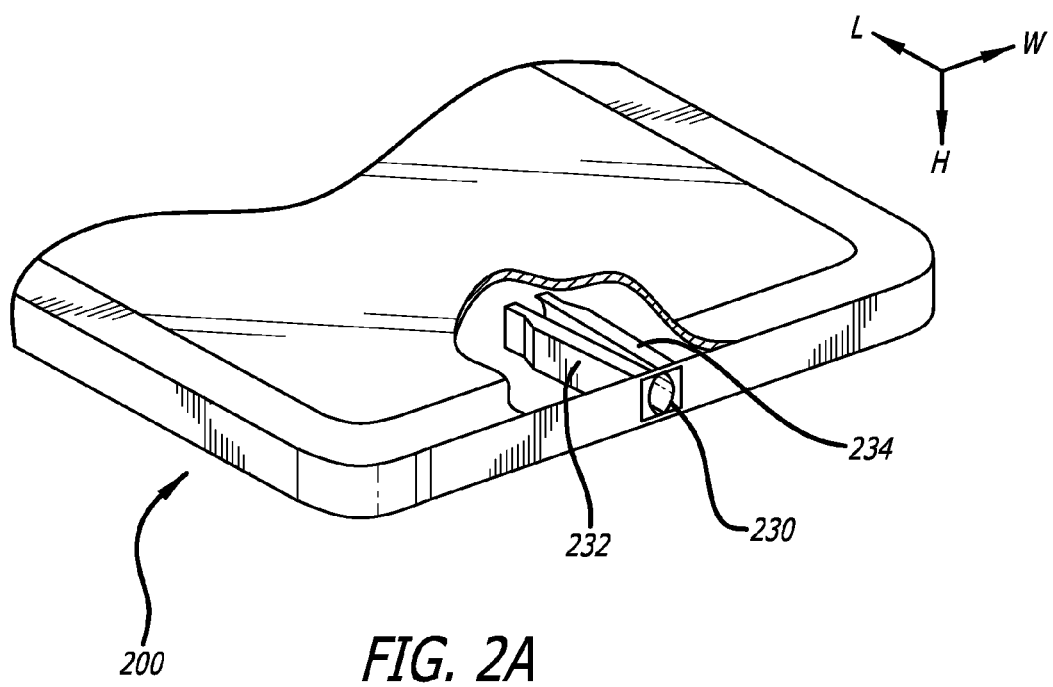
FIGS. 2A-2C illustrate an example of an electronic device with an adaptive port in accordance with one embodiment.
Figure 2B:
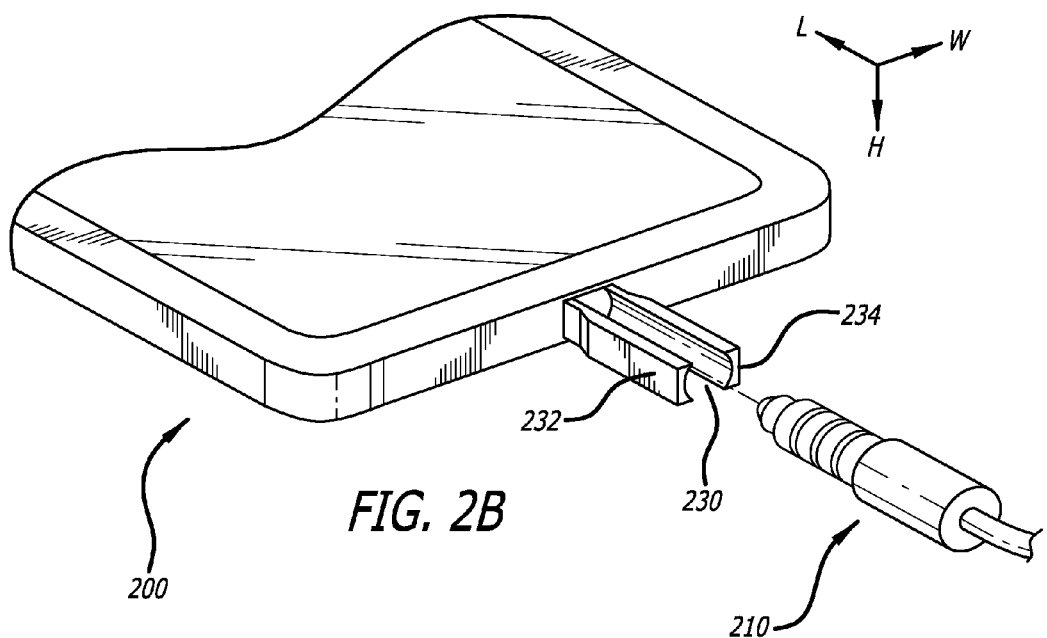
Figure 2C:
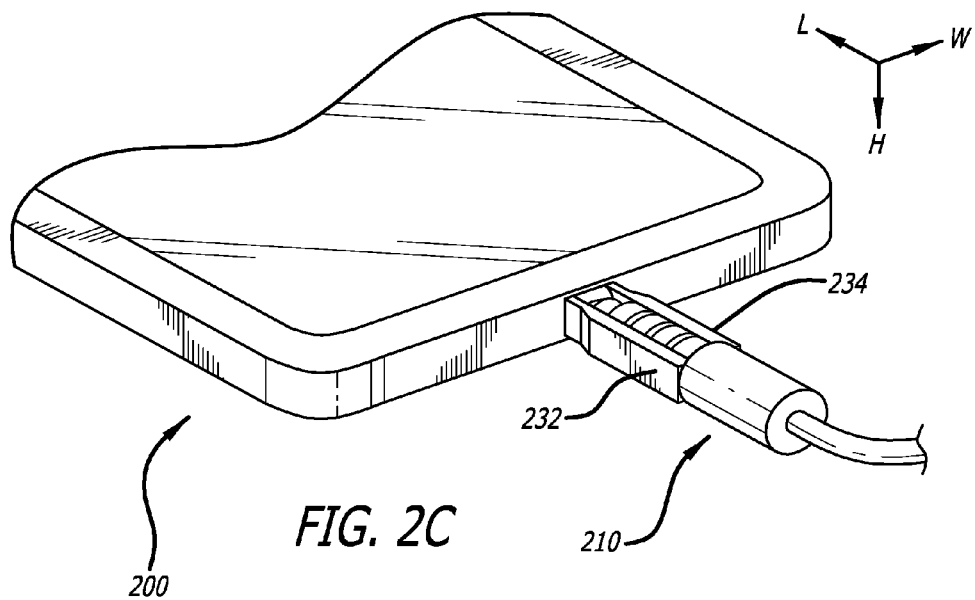

FIGS. 2A-2C illustrate an electronic device 200 with an adaptive or extensible port 230 according to an embodiment. The port 230 can support a plug or connector having at least one dimension that is substantially equal to or greater along at least one dimension of the device. Although a portable computing device (e.g., a smart phone, tablet computer, or e-book reader) is shown here, it will be appreciated that any electronic device capable of receiving and processing input can be used in accordance with various embodiments discussed herein. The devices can include, for example, desktop computers, notebook computers, electronic book readers, personal data assistants, cellular phones, video gaming consoles, televisions, DVD players, set top boxes, stereo systems, and portable media players, among others. In this example, the electronic device 200 is approximately 4.0 mm thick and the inner diameter of the circular opening 230 in FIG. 2A is approximately 2.5 mm but it should be understood that the device 200 and port 230 can comprise different dimensions. The port 230 is an audio port for a TRRS, TRS, or TS connector, but it will be appreciated that the port 230 can be designed to function with other types of connectors, such as power plugs, data ports, network ports, etc., in alternative embodiments.

In FIG. 2A, the adaptive or extensible port 230 can be characterized as being in a retracted state. While the port 230 is in the retracted state, a 2.5 mm audio jack or plug can be inserted and internal contacts on each of the left clasp 232 and right clasp 234, which together comprise a clutching mechanism, are aligned with the tip, ring, ring, and sleeve of a 2.5 mm TRRS connector (or the tip, ring, sleeve of a TRS connector or a tip and sleeve of a TS connector). The device 200 can therefore support a 2.5 mm TRRS connector while the adaptive or extensible port 230 is in the retracted state. In alternative embodiments, the adaptive or extensible port 230 can be configured to support plugs or jacks of different sizes, such as 3.5 mm audio plug or a 6.35 mm audio plug.

FIG. 2B depicts the device 200 with the adaptive or extensible port 230 in an unretracted or extended state. Left clasp 232 and right clasp 234 can each be coupled with one or more spring mechanisms such that pushing on the port 230 while it is in the retracted state will extend the left clasp 232 and right clasp 234. In other embodiments, the clasps 232 and 234 can be extended by pressing a specified keyboard key, performing an applicable user interface gesture or command, selecting an appropriate application, operating system (OS) element, or service to cause the clasps or clutching mechanism to extend, entering an applicable command line prompt, etc. When the clasps 232 and 234 are extended, the opening of the port 230 can be large enough to accommodate a larger audio plug or jack. In this example, the dimension of the face of the port 230 parallel to the width of the device is substantially equal to or larger than the thickness of the device 200. As shown in FIG. 2C, a 3.5 mm TRRS (or TRS or TS) plug or connector 210 can be inserted into and supported by left clasp 232 and right clasp 234. The curvature of the clasps 232 and 234 can help to hold the plug 210 securely in place. In certain embodiments, the clasps 232 and 234, the TRRS connector 210, or both can be magnetized to further secure the connection between the device 200 and the TRRS connector 210. In this manner, the device 200 can be designed to support audio ports of different sizes, such as a 2.5 mm TRRS connector while in the retracted state and a 3.5 mm TRRS connector, like connector 210, while in the unretracted or extended state. In one embodiment, the clasps 232 and 234 are rigid and only a connector of a specified size may be plugged into the adaptive port 230. In other embodiments, at least one of the clasps can include one or more lockable hinge mechanisms, clasping mechanisms, fastening mechanisms, interlocking mechanisms, joints, etc. to allow connectors of different sizes to be securely plugged into the adaptive port 230. The lockable hinge, clasping, fastening, interlocking mechanisms or joints may be located at the base of the clasps, i.e., the surface of the prong abutting the device 200. The lockable hinge, clasping, fastening, interlocking mechanisms or joints can be used to adjust the "grip" of the prong by unlocking and relocking to accommodate plugs of various sizes. Alternatively, or in addition, lockable hinge, clasping, fastening, or interlocking mechanisms or joints can be included along the body of the prong, and the clasps can "pinch" or "unpinch" the connector 210. The device 200 can also be configured to be backwards compatible such that the device 200 can support a port that is compliant with a standard in one state, e.g., the retracted state, and an older (or newer) standard in another state, e.g., the extended state. In addition, the device 200 can accommodate a plug or connector that is substantially equal to or greater than the thickness of the device 200. Here, the device is approximately 4.0 mm thick yet can accommodate a connector or plug that is 3.5 mm thick. In other embodiments, an electronic device can be configured to support ports of various sizes, such as a 3.5 mm TRRS connector in a retracted state and a 6.35 mm TRRS connector in the extended state. In still other variations, different types of ports, such as power plugs, USB™ ports, HDMI™ ports, DisplayPort™ plugs, Ethernet ports, etc., can be accommodated by an electronic device applying the teachings of one or more embodiments.

Figure 3C:
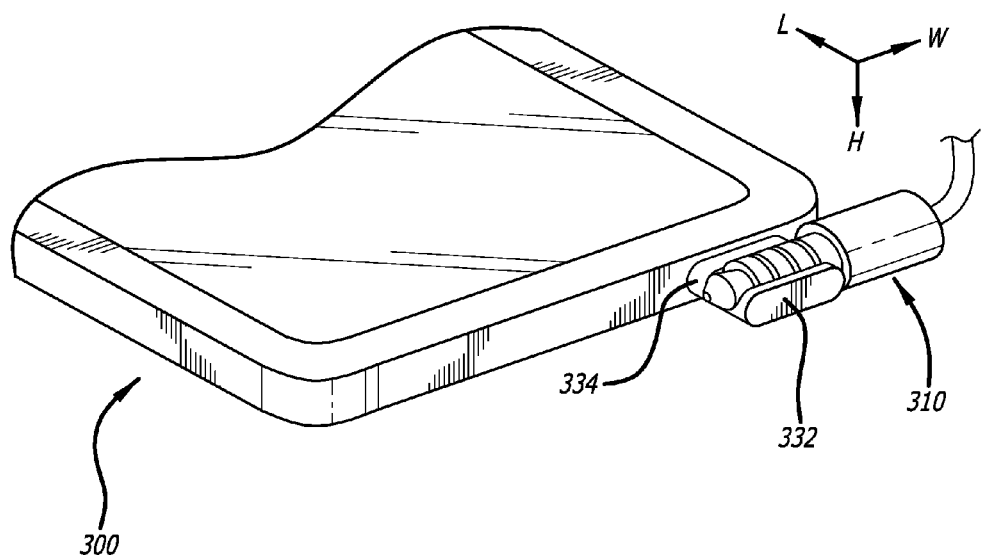

FIGS. 3A-3D illustrate an electronic device 300 with an adaptive or extensible port 330 according to an embodiment. FIG. 3A depicts the port 330 in a retracted state and FIG. 3B depicts a tray-like structure of the adaptive or extensible port 330 in an unretracted or extended state. The adaptive or extensible port 330 can include one or more spring mechanisms or guide rails or sliders to allow the tray to be manually retracted or extended in certain embodiments. In alternative embodiments, retraction and extension of the tray may be motorized. For example, the adaptive or extensible port 330 may be attached to motorized rollers that, when activated, extend (or retract) the tray. Other motorized mechanisms can incorporate racks and pinions, other gear configurations, guided rails or sliders, pulleys, belts, etc. In still other embodiments, a combination of manual and motorized approaches can be used to retract and extend the tray of the adaptive or extensible port 330. These various approaches for retracting and extending a tray are known to those of ordinary skill in the art, and will not be discussed herein in detail.

In this example, the electronic device 300 is approximately 3.0 mm thick and the adaptive or extensible port 330 can accommodate a 2.5 mm TRRS connector, such as connector 310. The configuration of FIG. 3B further illustrates that the dimension of the face of the port 330 parallel to the length of the device 300 is substantially equal to or greater than the height of the device 300. In another embodiment, the adaptive or extensible port 330 can be designed to accommodate a 3.5 mm TRRS connector. The adaptive or extensible port 330 is also illustrated as extending from what will be referred to herein as "side" surface 336 of the device 300. It should be understood, however, that various surfaces or components can be used in alternative embodiments, and terms such as "side," "top," "middle," "bottom," "front-facing," or "rear-facing" are used for purposes of explanation and do not require a specific orientation unless otherwise stated. For example, although the adaptive or extensible port 330 is shown to be located at the top of the side surface 336 of the device 300, in alternative embodiments the port 330 can be situated anywhere along the side surface 336, including the middle (such as shown in FIGS. 2A-2C) or bottom of the side surface 336. In addition, the adaptive or extensible port can extend from any surface of the device 300, including the front-facing surface, back-facing surface, or any of the other side surfaces of the device 300. The adaptive or extensible port 330 can also be extended by some of the aforementioned approaches described in FIGS. 2A-2C, such as by manually pushing on the port 330 while it is in the retracted state or by a software-based user command or gesture such as a keyboard key press or some other user interface method. In one embodiment, the user may also issue a voice command to cause the tray of the adaptive or extensible port 330 to be extended (or closed).

FIG. 3C illustrates the audio plug 310 locked into place by the tray-like structure of the adaptive or extensible port 330. In this example, the tray of the port 330 wraps around the connector 310 at approximately 270° to help lock the connector 310 into place when the connector 310 is "plugged" into the adaptive port 330. In various embodiments implementing a tray, the tray may wrap around the connector 310 at different degrees depending on the thickness of the device 300. The tray of the port 330, the connector 310, or both can be magnetized to further secure the connector 310 when it is "plugged" in. In one embodiment, the front portion 332 and the back portion 334 may be rigid and can only securely accommodate a plug of a specified size. In another embodiment, the left portion 332 of the tray, the back portion 334 of the tray, or both portions can each incorporate one or more lockable hinge, clasping, fastening, or interlocking mechanisms or joints to enable different size plugs or connectors to be locked into the port 330. For example, a default configuration can accommodate a 2.5 mm TRRS connector, lockable hinges, clasps, fasteners, or joints included in the side portions 332 and 334 of the tray can be unlocked and relocked to securely accommodate a 3.5 mm TRRS connector, and the lockable hinges, clasps, fasteners, or joints of the side portions 332 and 334 of the tray can be unlocked and relocked to securely accommodate a TRRS connector having a diameter less than 2.5 mm. In another embodiment, a spacer can be placed inside the tray of the port 330 to accommodate connectors of smaller sizes. The spacer can comprise a non-conductive material and may cover a portion of the interior of the tray, leaving at least some of the interior of the tray exposed to enable the contacts of the tray to connect to the contacts of the connector 310. Alternatively, the spacer can comprise a conductive material to connect the contacts of the tray of the adaptive port 330 to corresponding contacts of the connector 310. By implementing such approaches, the adaptive or extensible port can be configured to be compatible with connectors of various sizes, including a connector comprising at least one dimension that is substantially equal to or greater than at least one dimension of an electronic device.

Figure 3D:
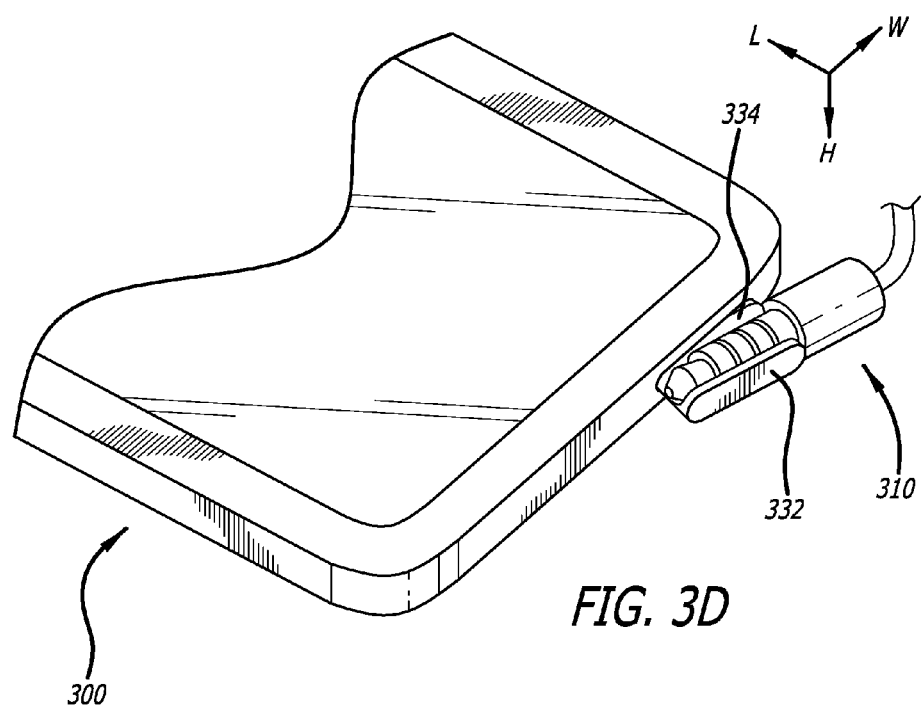

FIG. 3D depicts a variation of an adaptive or extensible port 330 in accordance with the embodiment of FIGS. 3A-3C. In this example, the tray of the adaptive or extensible port 330 includes a fulcrum at one end of the back portion 334 of the tray of the port 330, e.g., the left side of the back portion 334. When the adaptive or extensible port 330 is in a retracted state, the user must manually push the front portion 332 of the tray at the end diagonal to the fulcrum, e.g., the right side of the front portion 332, to cause the tray to be extended. Alternatively, or in addition, a software-based method such as previously discussed with respect to FIGS. 2A-2C, including activating a keyboard key or performing a user gesture or command, can cause the tray to be extended. In one embodiment, the tray may comprise two positions, the retracted state and an extended state where the tray is positioned at a specified angle from the device 300 that can accommodate the connector 310, such as a 30° angle. In another embodiment, the fulcrum may enable the tray of the port 330 to be pivot outward from the device 300, as well as be rotated 360° along the z-axis of the device, e.g., towards the user and away from the user when the user is facing the front face of the device 300. In this way, the tray of the adaptive port 330 can be arranged according to several different orientations. A locking mechanism included in the tray can lock the tray into place when the user has selected a desired orientation for the plug 310. Although an audio port is provided as an example in FIGS. 3A-3D, it should be understood that various different types of ports, such as power plugs, USB™ ports, HDMI™ ports, DisplayPort™ plugs, Ethernet ports, etc., can also be supported in alternative embodiments.

Figure 4C:
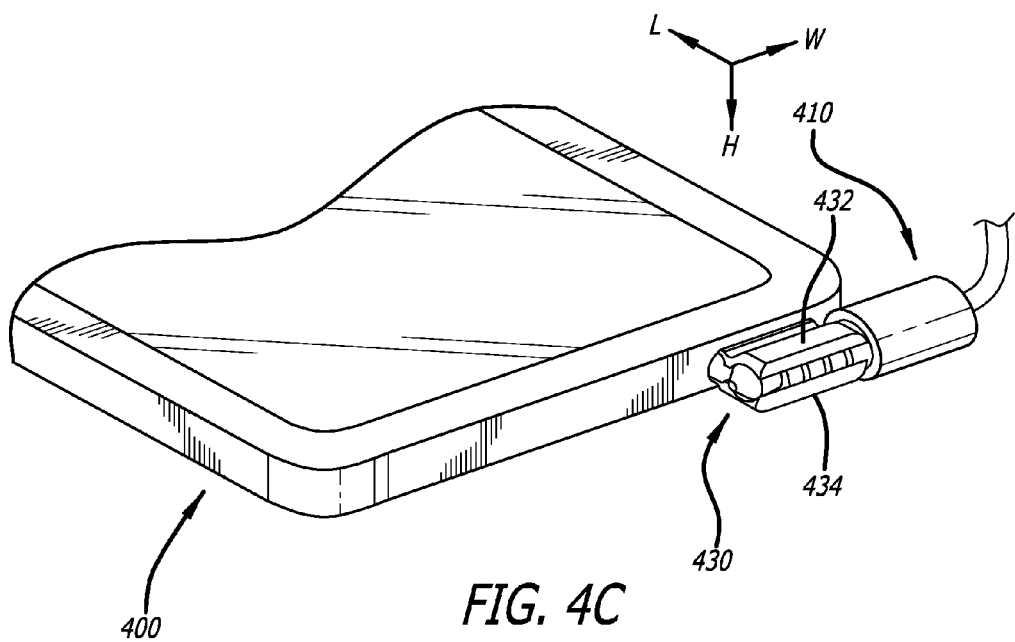

FIGS. 4A-4C illustrate an electronic device 400 with an adaptive or extensible port 430 according to an embodiment.

In particular, FIG. 4A illustrates the adaptive or extensible port 430 in a retracted state, FIG. 4B illustrates the adaptive port 430 in an unretracted or extended state, and FIG. 4C illustrates an audio plug 410 connected to the adaptive or extensible port 430 and electronic device 400. While an audio port and plug is provided for the example of FIGS. 4A-4C, it will be appreciated that other types of port and plug combinations can be implemented in alternative embodiments, including video ports and plugs, network ports and plugs, other data ports and plugs, etc. In this example, the adaptive or extensible port 430 includes an upper clip 432 and a lower clip 434 that are joined together to effectively seal the side surface 436 where the adaptive or extensible port 430 is located when the port 430 is in a retracted state, as shown in FIG. 4A. In addition, FIG. 4B also illustrates that the dimension of the face of the port 430 that is parallel to the length of the device 400 is substantially equal to or greater than the height of the device 400. To externally extend the clip structure of the adaptive or extensible port 430, one or more spring mechanisms may be situated at the back portion 438 of the clip structure. Alternatively, or in addition, the clip structure of the port 430 may be attached to a motorized mechanism, such as motorized rollers, racks and pinions, guided rails or sliders, pulleys, belts, etc., that can be activated to extend (and retract) the clip structure. The clip structure of the adaptive or extensible port 430 can be extended by manually uncoiling the one or more spring mechanisms by pressing on the adaptive port or the clip structure can be extended by activating the motorized mechanism through a software based approach, such as pressing an applicable keyboard key or performing an appropriate user interface gesture or command. As shown in FIG. 4C, a plug 410 is being held firmly in place by the clip structure of the adaptive or extensible port 430. In this example, the upper clip 432 and the lower clip 434 encircle the plug 410 by approximately 270° to hold the plug firmly in place. It should be understood that other embodiments may encircle the plug 410 at various degrees, and 270° is but one example. The clips 432 and 434, the back portion 438 (as shown in FIG. 4A), and/or the plug 410 may be magnetized to further secure the connector 410 while it is "plugged" into the port 430 and device 400.

In one embodiment, upper clip 432, lower clip 434, and back portion 438 (as shown in FIG. 4A) may be composed of a rigid material such that the adaptive or extensible port 430 can only accommodate one size for a connector (e.g., a 2.5 mm TRRS connector or a 3.5 mm TRRS connector). In another embodiment, upper clip 432, lower clip 434, and back portion 438 (as shown in FIG. 4A), i.e., the clip structure, may be composed of a thin and/or flexible yet durable material. The clip structure may be shaped such that tension along the back portion 438 forces the upper clip 432 and lower clip 434 closed. However, the back portion 438 will give way when an object, such as the plug 410, is inserted between the upper clip 432 and lower clip 434. Accordingly, the clip structure of the adaptive or extensible port 430 may be configured to support plugs of multiple sizes, such as a 2.5 mm TRRS connector or a 3.5 mm TRRS connector.

Figure 5A:
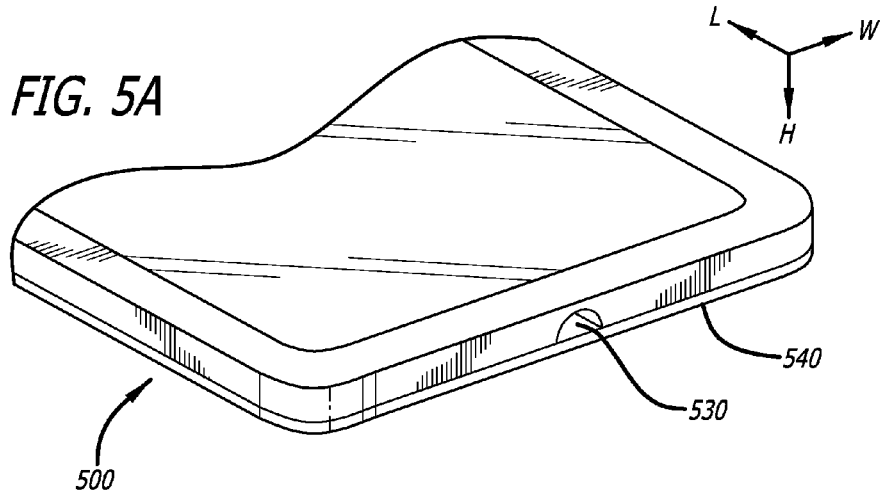
FIGS. 5A-5C illustrate an example of an electronic device with an adaptive port in accordance with one embodiment.
Figure 5B:
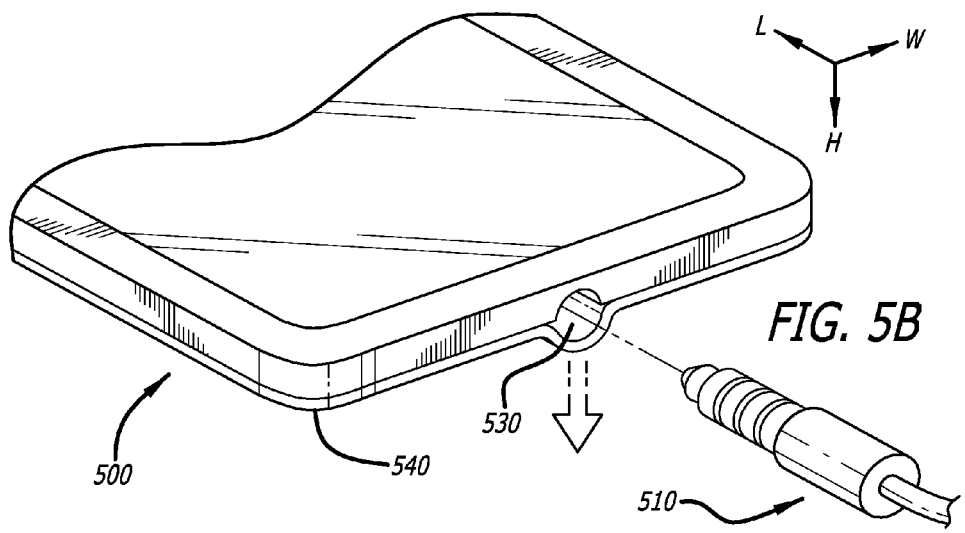
Figure 5C:
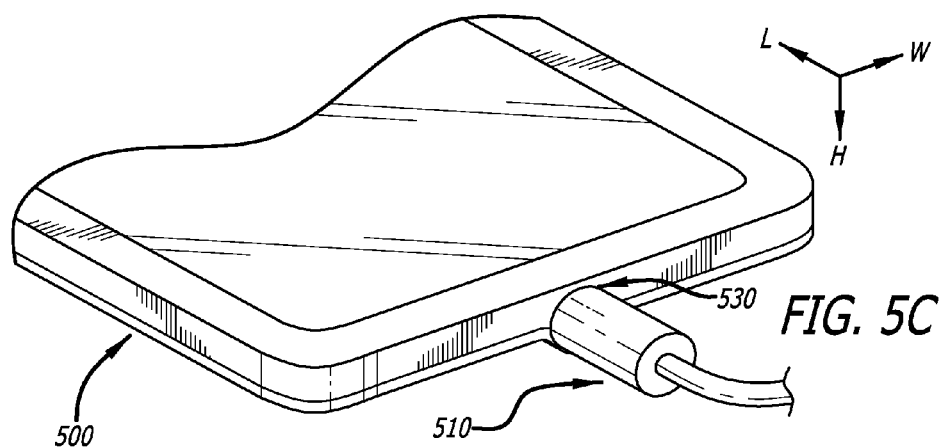

FIGS. 5A-5C illustrate an electronic device 500 with an adaptive or extensible port 530 according to an embodiment. Although FIGS. 5A-5C illustrate an audio port and plug combination, it should be understood that alternative embodiments may comprise ports and plugs for power, video, networking, data, etc. In this example, the electronic device 500 measures approximately 3.5 mm in thickness, and includes a bottom layer 540 composed of a resilient material such as silicone rubber. It will be appreciated that any resilient materials can be used for the bottom layer 540, such as plastics, other elastomers, thermoplastic elastomers, etc. As shown in FIG. 5A, the resilient material 540 may cover the entire rear-facing surface of the electronic device 500 to protect the device, at least in part, in the event of drops or other physical impact to the device. The resilient material 540 can also help to prevent the device 500 from slipping when placed on a smooth surface. In other embodiments, the resilient 540 may cover only a portion of the rear-facing surface of the device 500. FIG. 5A also depicts a partial opening corresponding to an adaptive or extensible port 530 for the electronic device 500. In particular, FIG. 5A illustrates the port 530 when it is not connected to a plug. FIGS. 5B and 5C demonstrate a second state wherein an audio plug or jack 510 is plugged into the port 530 according to an embodiment. As the resilient material 540 is a pliant material, the resilient material 540 will give way or "extend" when the plug 510 is inserted into the port 530, as shown in FIGS. 5B and 5C. The resilient material 540 will return or "retract" to its previous state when the connector 510 is unplugged from the port 530, as shown in FIG. 5A. FIGS. 5B and 5C also illustrate that the dimensions of the face of the port 530 is greater than the nominal height of the device 500 when audio plug or jack 510 is plugged into the port.

In another embodiment, instead of a cylindrical port for connecting the device 500 to an audio plug or jack, the device 500 can include substantially flat contacts that correspond to the contacts of the external audio plug or jack 510. When the device 500 is not connected to the audio plug or jack 510, the contacts of the device 500 may be covered and protected by cover comprising a resilient material. When the user desires to connect the device 500 to the external audio plug or jack 510, the user may uncover the cover and rest the audio plug or jack 510 onto the contacts of the device 500. The cover can be returned to its original position to envelop the external audio plug or jack 510 to keep the audio plug or jack 510 in place. The cover, the audio plug or jack 510, or both can be magnetized to further secure the plug or jack 510. In yet another embodiment, where the resilient material runs the length and/or width of the device 500, the resilient material may be "rolled" to attach (or detach) the external audio plug or jack 510 and "unrolled" to cover and protect the plug or jack 510 (or to cover and protect the flat contacts of the device 500). Preferably, the substantially flat contacts and the cover of the device 500 are situated on the rear-facing surface of the device 500, but the contacts and the cover may be located on any surface of the device 500 in alternative embodiments. In this manner, the device 500 can effectively support a connector or plug of any size, including a 2.5 mm connector, a 3.5 mm connector, and/or a 6.35 mm connector.

In various embodiments, the contacts of an adaptive or extensible port may also be dynamically configurable depending on the configuration of the device connecting to the adaptive or extensible port. For example, one configuration for a peripheral device with a TRRS connector is to associate the tip with left audio, the first ring with right audio, the second ring with ground, and the sleeve with an input signal such as a microphone signal or a remote control signal. A second configuration for a second peripheral device with a TRRS connector may associate the tip with the left audio, the first ring with right audio, the second ring with an input signal, and the sleeve with ground. In this situation, an electronic device with an audio port whose contacts are statically defined may not have complete functionality with at least one of these peripheral devices since the second ring and the sleeve of each of the first and second peripheral devices correspond to different "pin outs." Various embodiments can overcome this deficiency of conventional electronic devices by enabling dynamic configuration of the contacts of the audio port. For example, the electronic device can include an application to reconfigure the contacts of the audio port. The user may connect headphones or a headset into the electronic device and then run the reconfiguration application. The reconfiguration application may ask the user to press a button on a controller element of the headphones or speak into a microphone of the headset, and the reconfiguration application will switch the contacts of the device for input and ground depending on the contact from which the input signal is detected. In another embodiment, the reconfiguration application may comprise a toggle to switch between one of the two configurations for a TRRS connector. Such an implementation can be included as part of an OS application or service for establishing settings for the device. In yet another embodiment, the reconfiguration application may be implemented to enable the user to designate the contacts for the adaptive port.

Figure 6:
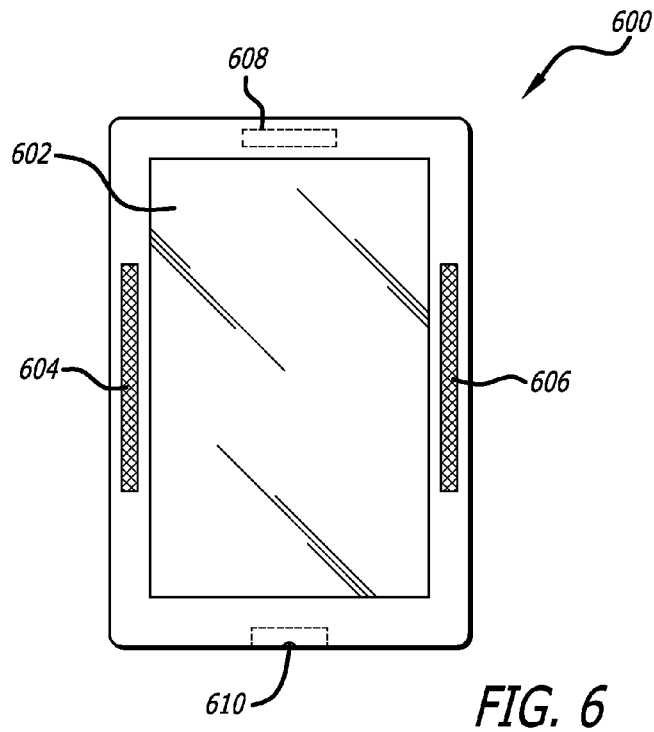
FIG. 6 illustrates an example device that can be used in accordance with various embodiments.

FIG. 6 illustrates an example of an electronic device 600, i.e., a portable computing device such as a smart phone, tablet, or e-book reader, that can be used in accordance with various embodiments. In this example, the computing device 600 has a display screen 602, which under normal operation will display information to a user facing the display screen (e.g., on the same side of the computing device as the display screen). The computing device in this example can include one or more audio output elements, in this example, a left speaker 604 and a right speaker 606, each located on the face of the computing device 600, although it will be appreciated that audio output elements could also, or alternatively, be placed on the top and bottom of the face of the device or the sides or back of the device, and that there can be any appropriate number of audio output elements of similar or different types. The computing device 600 can also include at least one microphone 608 or other audio capture element(s) capable of capturing other types of input data, as known in the art. In this example, the computing device 600 also includes an adaptive or extensible port 610 for an audio jack as described in FIGS. 2A-2C above. Various other types of input can be utilized as well as known in the art for use with such devices.

Figure 7:
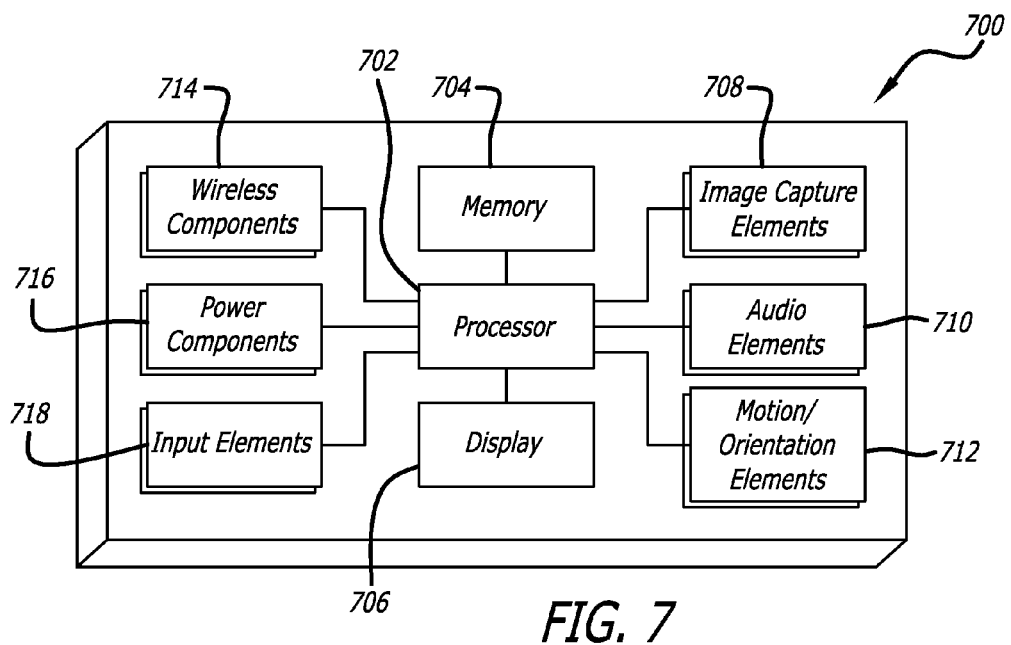
FIG. 7 illustrates an example configuration of components of a device such as that described with respect to FIG. 6.

In order to provide various functionality described herein, FIG. 7 illustrates an example set of basic components of a computing device 700, such as the device 600 described with respect to FIG. 6. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. As discussed above, the device in many embodiments will include one or more image capture elements 708, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element can include, or be based at least in part upon any appropriate technology, such as a CCD or CMOS image capture element having a sufficient resolution, focal range, viewable area, to capture an image.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one or more motion and/or orientation elements 712 that provide information such as a position, direction, motion, or orientation of the device. These one or more motion and/or orientation determining elements 712 can include, for example, accelerometers, inertial sensors, electronic gyroscopes, electronic compasses, and GPS elements.

The example device can also include one or more additional input devices 718 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The example device also includes one or more wireless components 714 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a portable computing device, which can include capacitive charging elements for use with a power pad or similar device as discussed elsewhere herein. The example device also can include at least one touch and/or pressure sensitive element 718, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

The specification and drawings are to be regarded in an illustrative rather than a restrictive sense. It will, however, be evident that various modifications and changes may be made thereunto without departing from the broader spirit and scope of the invention as set forth in the claims.

What is claimed is:

1. A portable computing device, comprising:
a housing structure comprising an audio port, the audio port being extensible from the housing structure to enable connection of the portable computing device to an audio plug, one or more outer dimensions of a face of the audio port being equal to or greater than a thickness of the housing structure when the audio port is in an extended state, the audio port being configured to engage external plugs having various sizes depending upon a position of the audio port, the audio port having a recessed configuration and an extended configuration, the recessed configuration engaging plugs of a first size and the extended configuration engaging plugs of a second size, the first size being smaller than the second size.

2. The portable computing device of claim 1, wherein:
the audio port comprises one or more clasps situated within the housing structure when the audio port is in a retracted state and externally exposed when the audio port is in the extended state, the clasps securing, at least in part, the audio plug to the portable computing device when the audio plug is plugged into the audio port in the extended state.

3. The portable computing device of claim 2, wherein:
in the retracted state, the audio port accommodates a first audio plug comprising a first diameter; and
in the extended state, the audio port accommodates a second audio plug comprising a second diameter, the second diameter being greater than the first diameter.

4. An electronic device, comprising:
a port that is extensible to enable connection of the electronic device to an external plug, a first dimension of a face of the port being equal to or greater than a second dimension of the electronic device when the port is in an extended state, the port being configured to engage external plugs having various sizes depending on a position of the port, the port having a recessed configuration and an extended configuration, the recessed configuration engaging plugs of a first size and the extended configuration engaging plugs of a second size, the first size being smaller than the second size; and
a data processing element performing operations relating to one or more signals received from or transmitted through the port.

5. The electronic device of claim 4, wherein:
the port comprises one or more clasps situated within the electronic device when the port is in a retracted state and externally exposed when the port is in the extended state, the clasps securing, at least in part, the external plug to the electronic device when the external plug is plugged into the port in the extended state.

6. The electronic device of claim 5, wherein:
the port comprises an audio port;
in the retracted state, the port accommodates a first audio plug comprising a first diameter; and
in the extended state, the port accommodates a second audio plug comprising a second diameter, the second diameter being different from the first diameter.

7. The electronic device of claim 6, wherein:
the first audio plug comprises a 2.5 mm audio plug; and
the second audio plug comprises a 3.5 mm audio plug.

8. The electronic device of claim 4, wherein:
the port comprises one of an audio port, a video port, a network port, a data port, a power port, or a combination of two or more thereof.

9. The electronic device of claim 4, wherein:
in the retracted state, the port is compatible with a first version of a standard; and
in the extended state, the port is compatible with a second version of the standard.

10. An electronic device, comprising:
a port that is characterized by a retracted state and an extended state; and
a data processing element performing operations relating to one or more signals received from or transmitted to the port,
wherein the port enables connection of the electronic device to external plugs, a first dimension of a face of the port being equal to or greater than a second dimension of the electronic device when the port is in the extended state, the port being configured to engage external plugs having various sizes depending upon a position of the port, the port having a recessed configuration and an extended configuration, the recessed configuration engaging plugs of a first size and the extended configuration engaging plugs of a second size, the first size being smaller than the second size.

11. The electronic device of claim 10, wherein:
in the retracted state, the port accommodates the first external plug comprising a first set of dimensions; and
in the extended state, the port accommodates a second external plug comprising a second set of dimensions, one dimension of the second set of dimensions being different from a corresponding dimension of the first set of dimensions.

12. The electronic device of claim 11, wherein:
in the retracted state, the port is compatible with a first version of a standard; and
in the extended state, the port is compatible with a second version of the standard.

13. The electronic device of claim 10, wherein:
the port comprises one of an audio port, a video port, a network port, a data port, a power port, or a combination of two or more thereof.

14. The electronic device of claim 10, wherein:
the port comprises one or more clasps situated within the electronic device when the port is in the retracted state and externally exposed when the port is in the extended state, the clasps securing, at least in part, a first external plug to the electronic device when the first external plug is plugged into the port in the extended state.

15. The portable computing device of claim 3, wherein:
the first diameter is 2.5 mm; and
the second diameter is 3.5 mm.

16. The electronic device of claim 4, wherein the port is configured to engage a first external plug when the port is in a recessed position and is further configured to engage a second external plug when the port is in an extended position, the first external plug being smaller than the second external plug.